Figure 1:
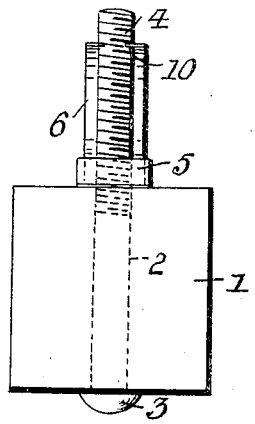

No. 792,360. PATENTED JUNE 13, 1905.
A. L. STAGNER.
NUT LOCK.
APPLICATION FILED DEC. 20, 1904.

Witnesses:

Inventor
Andrew L. Stagner,
By N. C. Evert & Co.
Attorneys.

No. 792,360.

Patented June 13, 1905.

UNITED STATES PATENT OFFICE.

ANDREW L. STAGNER, OF PITTSBURG, PENNSYLVANIA.

NUT-LOCK.

SPECIFICATION forming part of Letters Patent No. 792,360, dated June 13, 1905.

Application filed December 20, 1904. Serial No. 237,646.

*To all whom it may concern:*

Be it known that I, ANDREW L. STAGNER, a citizen of the United States of America, residing at Pittsburg, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and more particularly to a novel form of washer which is employed for locking nuts upon bolts.

The object of this invention is to provide a washer which can be readily stamped or pressed from sheet metal and bent to a desirable form to engage a nut which has been placed upon a bolt and prevent the same from rotating.

Briefly described, my improved nut-lock comprises a sheet of metal which is provided with an aperture approximately close to its one end, while the opposite end of this sheet of metal is provided with a slot. The aperture and slot are formed of a sufficient width to engage a bolt, upon which the same may be placed to retain a nut thereon. Prior to placing the nut upon the bolt the washer is placed upon the bolt, and after the nut has been placed thereon the one end of the washer is bent up to engage the edge of the nut, while the slotted end thereof is bent around and forced downwardly into engagement with the threads of the bolt, whereby the washer will be prevented from rotating.

The above construction will be hereinafter more fully described and then specifically pointed out in the claim, and referring to the drawings accompanying this application like numerals of reference designate corresponding parts throughout the several views, in which—

Figure 2:
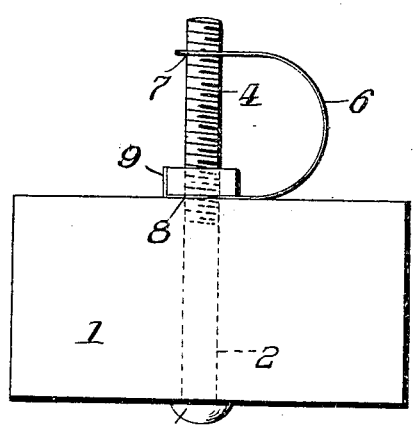
Figure 3:
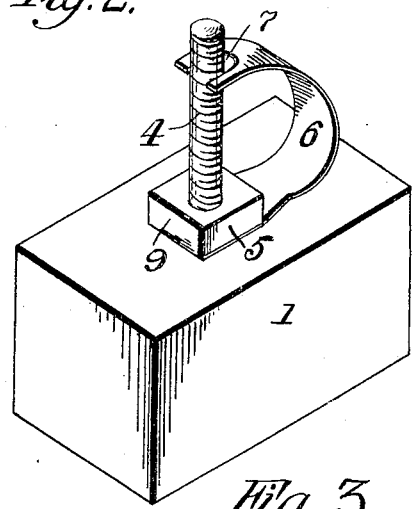

Figure 1 is an end view of my improved nut-lock, illustrating the same as placed upon a bolt which passes through the piece of material. Fig. 2 is a side elevation of the same. Fig. 3 is a perspective view of my improved nut-lock.

In the accompanying drawings the reference-numeral 1 designates a piece of material in which I have mounted a bolt 2, having a head 3 and a screw-threaded end 4.

The reference-numeral 5 designates a nut which I have illustrated as being secured upon the bolt 2.

The nut-lock as constructed by me comprises a strip of metal 6, having a slotted end 7. Adjacent to the opposite end of the strip I form an aperture 8, through which the bolt 2 is adapted to pass. When the washer has been placed upon a bolt and a nut secured thereon, the one end of the washer is bent up to engage the side of the nut, as indicated at 9, while the slotted end of the washer is bent around and forced downwardly into the threads of the bolt, as indicated at 10. In placing the slotted end in engagement with the bolt I partially mutilate the same, as illustrated in Fig. 1 of the drawings, whereby two flat surfaces will be provided for the slotted end 7 of the washer 6 to bear against.

It will be observed from the foregoing description, taken in connection with the drawings, that my improved nut-lock can be easily and quickly secured upon a bolt and locked thereon and that the slotted end 7 of the nut-lock can be returned to its normal position, which will permit of the nut being removed.

The nut-lock can be readily stamped from a sheet of metal and may be formed of different sizes to correspond to the different-sized bolts and nuts.

It will be noted that various changes may be made in the details of construction without departing from the general spirit and scope of the invention.

What I claim, and desire to secure by Letters Patent, is—

The combination with a nut and bolt, of a strip of metal, said strip of metal having an aperture formed therein, through which said bolt is adapted to pass, the end of said strip of metal being bent to engage the nut secured upon said bolt, the opposite end of said strip of metal having a slot formed therein and adapted to be bent around the nut and brought into engagement with the threads of said bolt, substantially as described.

In testimony whereof I affix my signature in the presence of two witnesses.

ANDREW L. STAGNER.

Witnesses:
 H. C. EVERT,
 K. H. BUTLER.